(12) United States Patent
Wagner et al.

(10) Patent No.: US 6,424,924 B1
(45) Date of Patent: Jul. 23, 2002

(54) METHOD AND DEVICE FOR DETERMINING THE FUEL RESERVE IN A MOTOR VEHICLE FUEL SYSTEM

(75) Inventors: Axel Wagner, Bonn-Beuel; Rüdiger Walter, Bonn, both of (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 09/742,856

(22) Filed: Dec. 21, 2000

Related U.S. Application Data

(63) Continuation of application No. PCT/DE99/01853, filed on Jun. 22, 1999.

(30) Foreign Application Priority Data

Jun. 25, 1998 (DE) .......................................... 198 27 944

(51) Int. Cl.[7] .............................................. G01F 23/22
(52) U.S. Cl. ........................................ 702/55; 73/149
(58) Field of Search ............................. 702/55, 51, 45, 702/50, 12, 100, 156, 116; 73/1.16, 1.73, 1.31, 861, 861.01, 861.02, 219, 220, 221, 290 R, 291, 300, 301, 305, 306, 307, 308, 313, 767, 53.04, 764, 447; 340/450.2

(56) References Cited

U.S. PATENT DOCUMENTS

| 4,244,210 A | * | 1/1981 | Prohaska et al. ............... 73/113 |
| 4,912,646 A | * | 3/1990 | Cerruti ......................... 702/55 |
| 4,967,181 A | * | 10/1990 | Iizuka et al. ............... 340/450.2 |
| 5,560,342 A | * | 10/1996 | Fournier et al. ............. 123/509 |
| 5,951,050 A | * | 9/1999 | Siekmann .................... 280/830 |
| 5,979,485 A | * | 11/1999 | Tuckey et al. ................ 137/143 |
| 6,002,328 A | * | 12/1999 | Wallrafen ................. 340/450.2 |
| 6,125,696 A | * | 10/2000 | Hannan et al. ................ 73/304 |
| 6,252,499 B1 | * | 6/2001 | Gerdtz et al. ............. 340/450.2 |

FOREIGN PATENT DOCUMENTS

| DE | 3224919 A1 | 1/1984 |
| DE | 3825630 A1 | 2/1990 |
| DE | 4332946 A1 | 3/1995 |
| DE | 19547097 A1 | 6/1997 |
| DE | 19610154 A1 | 9/1997 |
| DE | 19654728 A1 | 7/1998 |
| DE | 19727923 A1 | 1/1999 |

* cited by examiner

*Primary Examiner*—Marc S. Hoff
*Assistant Examiner*—Edward Raymond
(74) *Attorney, Agent, or Firm*—Akin, Gump, Strauss, Hauer & Feld, L.L.P.

(57) ABSTRACT

A method and a device are provided for determining the amount of fuel in the fuel tank of a motor vehicle. The fuel tank has a main storage reservoir which is provided with a filling level meter for determining the respective fuel therein and a reserve reservoir which is of substantially smaller volume in comparison with the main storage reservoir, which is closed in itself, and which is supplied with fuel by a pump from the main storage reservoir. After the main storage reservoir is emptied, the fuel reserve which is then still contained in the reserve reservoir is calculated as the difference of a defined volume of the reserve reservoir (12) and the fuel consumption summed over time.

20 Claims, 2 Drawing Sheets

METHOD AND DEVICE FOR DETERMINING THE FUEL RESERVE IN A MOTOR VEHICLE FUEL SYSTEM

CROSS-REFERENCE TO RELATED APPLICATION

This application is a continuation of International Application No. PCT/DE99/01853, filed Jun. 22, 1999, the disclosure of which is incorporated herein by reference.

BACKGROUND OF THE INVENTION

The invention relates to a method and a device for determining the respective amount of fuel in the fuel tank of a motor vehicle, wherein the fuel tank has a main storage reservoir provided with a filling level meter for determining the respective fuel contained therein, and a reserve reservoir (i.e., reserve tank) which is of substantially smaller volume in comparison with the main storage reservoir, which is closed in itself, and which is supplied with fuel by a pump from the main storage reservoir.

German patent DE 32 24 919 discloses a measuring device for operating fluid storage arrangements of motor vehicles which are provided with a fuel system having a main storage reservoir and a secondary storage reservoir which is of substantially smaller volume in comparison with the main storage reservoir, which is closed in itself, and which is supplied with fuel by a pump from the main storage reservoir.

In that case, associated with the main storage reservoir and the secondary storage reservoir are a main sensor device and an auxiliary sensor device, respectively, for detecting the fuel supply. Up to the moment in time at which the main storage reservoir is completely emptied, the main sensor device, which is associated with the main storage reservoir, emits a signal specifying the filling level in the fuel tank so that, on the basis of the tank geometry, it is possible to calculate a value in respect of fuel amount, that gives a display specifying the respective amount of fuel which is present in total in the main storage reservoir and the second storage reservoir. After the main storage reservoir is completely emptied, the display of the fuel which is still present in the secondary storage reservoir is implemented by the auxiliary sensor device associated with the secondary storage reservoir. This is intended to provide a more accurate display in respect of the fuel reserve which is still present.

German published patent application DE 196 10 154 A discloses a tank display and a method for ascertaining the residual volume in a tank, which has a reservoir, referred to there as a surge pot, and an additional tank from which the fuel can be emptied into the main tank when a given low level of fuel in the main tank is reached. The respective residual volume of fuel which comes from the additional tank is calculated on the basis of fuel consumption values. This procedure may admittedly permit sufficiently accurate determination of the fuel reserve which is still present in the tank in each case. However, this is only achieved at the cost of considerable additional expenditure, as the main tank must be provided with an additional tank, which is connected to the reservoir or surge pot by way of a conduit, which can be closed by means of a valve.

In addition, German published patent application DE 38 25 630 A discloses a method for determining and displaying the storage amount of fuel contained in a storage container, in which there is provided a static sender which supplies the initial value for the display. The consumption values which mount up during operation of a motor vehicle are calculated by consumption measurement operations or by evaluation of consumptiondetermining engine characteristic values, and subtracted from that initial value. The resulting difference is displayed. In this case, the degree of accuracy of the display of the reserve which is still present is dependent, even in the reserve range, that is to say when there is only little fuel still contained in the tank, on the degree of accuracy with which firstly the entire initial volume is determined by the sender, which includes a measurement float that is subjected without a damping effect to the fluctuations in level of the storage amount, wherein the initial value of the storage amount can also be replaced by a mean value formed from sender output signals, which are detected at relatively large time intervals. DE 38 25 630 A1 does not disclose any details in regard to the configuration of the tank and the definition of a given amount of fuel which, when the tank is substantially emptied, still forms a reserve amount for a given distance to be travelled.

BRIEF SUMMARY OF THE INVENTION

The invention is based on a method and a device for determining the respective amount of fuel contained in the fuel tank of a motor vehicle, as described at the outset, particularly with reference to the state of the art disclosed in DE 32 24 919 A.

An object of the present invention is to permit, by simple means and with the maximum possible level of accuracy, determination of the respective reserve which is still present in the fuel system in the last phase of emptying thereof, when fuel is only still present in the surge pot, which is also referred to as the reserve reservoir or reserve tank, in order thus to provide the driver with more accurate information about the respective amount of fuel which is still present. In this respect, the invention seeks to provide that it is not necessary for the tank used for this purpose to be fundamentally different in structure from that of conventional tanks.

This object is achieved by a method in which the residual volume of fuel disposed in the fuel tank at any given time is calculated on the basis of the fuel consumption wherein, after emptying of the main storage reservoir, the respective fuel reserve which is then still contained in the reserve reservoir is calculated as a difference from a defined volume of the reserve reservoir and the fuel consumption summed over time. The signal for establishing the moment in time from which determination of the fuel reserve in the reserve reservoir by means of consumption calculation begins is triggered in dependence on the fuel falling below a given filling level in the reserve reservoir. This object is further achieved by a device in which there is provided a first sensor which is associated with the reserve reservoir and which, after emptying of the main storage reservoir, outputs a signal triggering a calculation procedure by which the respective fuel reserve still contained in the reserve reservoir is determined as a difference from a defined volume of the reserve reservoir and the fuel consumption summed over time.

A method that is particularly desirable is one in which the moment in time at which the operation of determining the reserve in the reserve reservoir by consumption calculation begins is established in dependence on the filling level in the main storage reservoir and a given filling level in the reserve reservoir, for example in such a way that a filling level meter associated with the main storage reservoir outputs a signal which states that the main storage reservoir is empty and, in addition, a signal is triggered by a sensor associated with the reserve reservoir when the level falls below the given filling level in the reserve reservoir. The sensor is desirably arranged beneath the maximum filling level in the reserve reservoir, so that consumption calculation only begins when the level of liquid in the reservoir is at a spacing from the upper boundary thereof, so that surge movements of the liquid as a result of travel dynamics of the vehicle have a less severe effect. Furthermore, the fact that the sensor in the reserve reservoir is not associated with the maximum possible filling level therein prevents the reserve calculation procedure being initially started and then cut off again when, with the main reservoir almost empty, small amounts of fuel are still being conveyed into the reserve reservoir, for example in dependence on the travelling conditions of the vehicle, so that the filling level reaches the sensor again. The arrangement of the sensor in the reserve reservoir should therefore be so selected that, under normal operating conditions, no further fuel is conveyed out of the main storage reservoir into the reserve reservoir after the level of fuel has fallen below the filling level determined by the position of the sensor in the reserve reservoir, whereby calculation of the fuel consumption has been triggered, to ascertain the fuel reserve.

In dependence on the dimension of the reserve reservoir, in particular in the plane in which movements of the vehicle occur, it may also be desirable to provide the reserve reservoir with internal fitments which substantially reduce movements of the fuel in the reserve reservoir. If the beginning of the moment in time at which the operation of determining the respectively present reserve by calculation of the fuel consumption begins is determined in dependence on the presence of two signals - one which indicates that the main storage reservoir is substantially empty and a later second signal which displays the filling level of the reserve reservoir—the amount of liquid which is still present at the beginning of the consumption calculation procedure can be determined with a level of accuracy which is adequate for all practical requirements.

In this respect, it may be desirable for the tank to be so designed that filling thereof is effected by way of the reserve reservoir. For that purpose, there may be provided a filling pipe which connects the filling opening of the tank to the reserve reservoir.

If, in the operating phase in which the fuel reserve in the reserve reservoir is ascertained by consumption measurement, fuel is added, for example from a spare fuel can, in an amount which is not sufficient to fill the reserve reservoir to the filling level corresponding to the position of the sensor, correction of the procedure for ascertaining the fuel reserve would not be possible. On the contrary, the display of the fuel reserve would remain at the value calculated prior to the refilling operation. It may therefore be desirable to associate with the reserve reservoir a second sensor which is arranged at a spacing beneath the first sensor and which thus responds to a smaller volume of fuel in the reserve reservoir. As soon as the level of fuel, in operation of the motor vehicle, falls below the level of the second sensor in the reserve reservoir, the signal which is triggered thereby can be used to calculate the fuel reserve still present in the reserve reservoir, once again by way of the consumption. Naturally, in this case, the procedure starts from an initial value which is smaller than that of the volume which corresponds to the position of the first sensor. Desirably, the second sensor is so arranged that, after a usual volume (for example 5 liters) of fuel has been added from a spare can, the second sensor is below the then-existing liquid level.

In accordance with a further embodiment of the invention, it may be desirable for the engine of the motor vehicle to be switched off automatically after the amount of fuel in the reserve reservoir falls below a given minimum amount of fuel. This is intended to prevent air, which causes operational problems to the engine, from passing into the fuel supply system for the engine, in particular in the high-pressure part thereof. Before the engine is automatically shut off, the attention of the driver should be directed, by virtue of a suitable display, to the fact that the engine is soon going to be shut off, at a sufficient time interval before the engine is shut off.

In other respects, the arrangement is such that the filling level meter associated with the main storage reservoir is re-activated as soon as, with a rising level of fuel in the main storage reservoir, the filling level meter switches from the empty display to displaying a given level of liquid in the main storage reservoir. The signal can at the same time also influence the on-board computer or the like so that computation of the fuel consumption is terminated. The computer is only re-activated for that computation when, in the course of travel of the vehicle, the prerequisites already referred to above recur, more specifically, an empty display in respect of the main storage reservoir and the level of liquid in the reserve reservoir falling below the filling level which is established by the position of the first sensor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
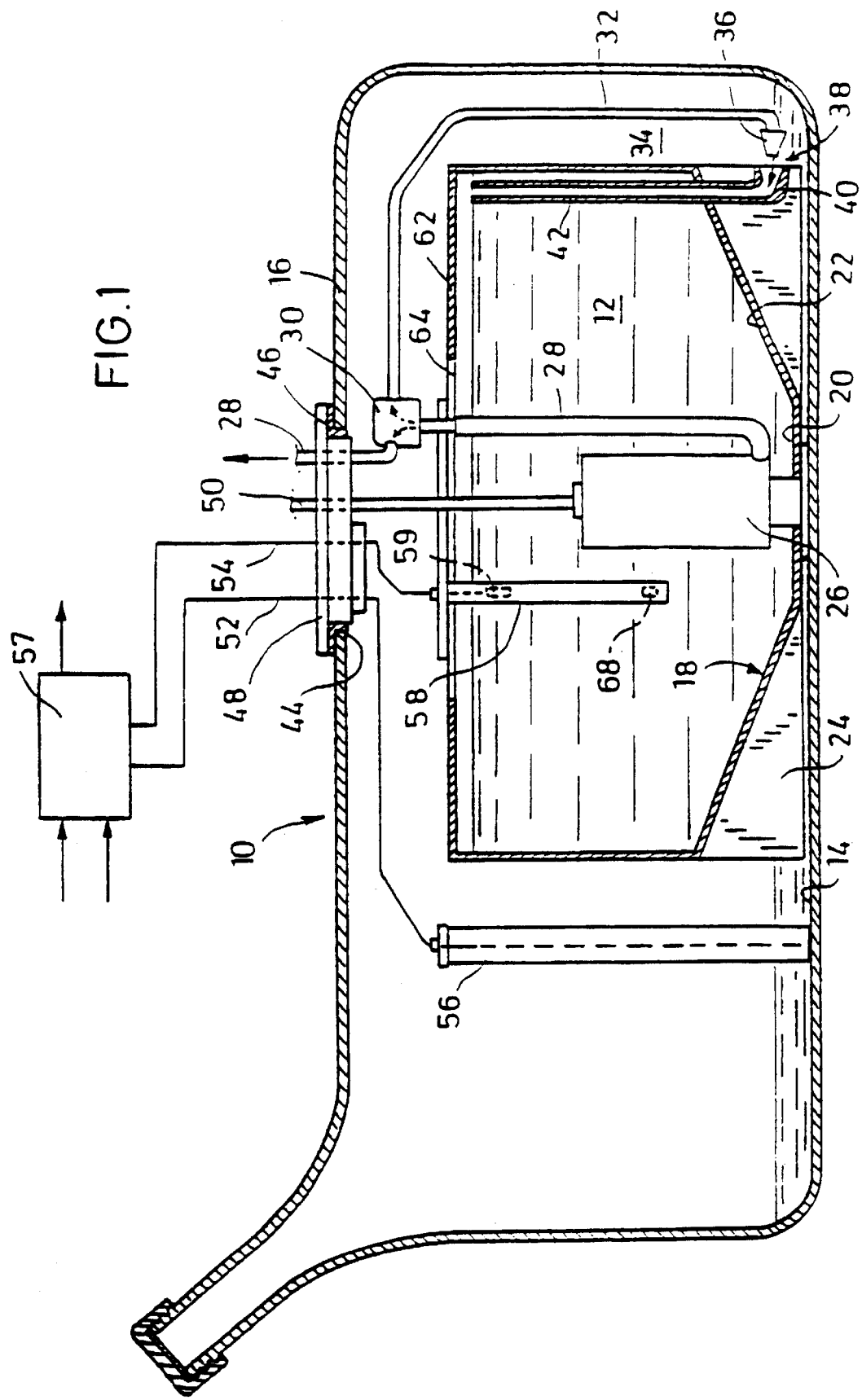
FIG. 1 is a view in longitudinal section through a first embodiment of a tank according to the invention.

The fuel tank 10 can be made in various ways in one piece or in a multi-piece structure from plastic material or metal. It is provided with a reserve tank or reservoir 12, which is of a substantially smaller volume than the main space 34 surrounding the reserve reservoir 12, and which represents the reserve region of the fuel system. The reserve reservoir (12) preferably has a volume of about 2 to 12 liters or about 2 to 15 % of the volume of the tank (10). The reserve reservoir 12 is suitably fixed to the bottom 14 of the tank. The reserve reservoir 12, which is partially open at the top, terminates at a spacing from the upper wall 16 of the tank. The reserve reservoir 12 is provided at its upper end with an internally peripherally extending edge portion 62, so that there is only an overflow opening 64. Otherwise the reserve reservoir 12 is closed in itself, so that no fuel can pass from the reserve reservoir into the main storage reservoir 34.

The bottom 18 of the reserve reservoir 12 is provided with a central region 20, which extends substantially perpendicularly to the longitudinal axis of the reserve reservoir and parallel to the bottom of the tank 14. The outer region 22 of the bottom 18, which adjoins the central region 20, is arranged to extend in a rising configuration towards the periphery of the reserve reservoir, so that the outer region 22, starting from the central region 20, is at a spacing from the bottom 14 of the tank, that spacing increasing in a direction towards the periphery. In order to be able to mount the reserve reservoir 12 with the necessary degree of stability within the tank 10, it is provided at its underside in the outer region of its bottom with substantially radial ribs 24 which are spaced around the periphery of the reserve reservoir and which rest on the bottom 14 of the tank.

Fixed within the reserve reservoir 12 in the central and deepest region 20 of the bottom 18 thereof is a single-stage electric fuel pump 26 to which there is connected a conduit 28 which leads to the engine. Connected into the conduit 28 in known manner within the tank 10 is a pressure regulator 30 from which a return conduit 32 extends. Any excess amount of fuel is branched off in the pressure regulator 30. That excess amount of fuel is returned to the space 34 of the tank 10, which surrounds the reserve reservoir 12, through the return conduit 32 which is disposed outside the reservoir 12. At the discharge flow end thereof, the return conduit 32 is provided with a propulsion nozzle 36 of a suction jet pump 38 whose catch or receiving nozzle 40 forms the intake flow end of an overflow pipe 42, as is shown in the drawing. The overflow pipe is arranged to extend substantially vertically and opens at a small spacing from the upper boundary of the reserve reservoir 12 within same and is passed in liquid-tight relationship through the outer region 22 of the bottom, the configuration thereof permitting the suction jet pump 38 to be disposed in the region beneath the reserve reservoir 12.

In its top wall 16, the tank is provided with an opening 44, which is closed by a cover 48, with the interposition of a seal 46. The fuel conduit 28 leading to the engine as well as electric lines 50 for the power supply to the pump 26 and electric connecting lines 52 and 54 are passed in liquid-tight relationship through the cover 48. The line 52 serves to make a connection between the filling level meter 56, which is a capacitive meter or which is designed in some other fashion, and an electronic computer 57 which can be the on-board computer of the vehicle. The line 54 represents the connection between a first sensor 59 and/or a second sensor 68 in the reserve reservoir 12 and the computer. The filling level meter 56 is arranged in the main space 34 of the tank 10, which surrounds the reserve reservoir 12, while the first sensor 59 and the second sensor 68 are arranged within the reserve reservoir 12 in a riser or dip pipe 58.

The fuel which is to be fed to the engine is taken from the reserve reservoir 12, in which case the fuel which is conveyed into the reservoir 12 from the main space 34 of the tank by way of the suction jet pump 38 always maintains the level within the reservoir 12 at a maximum height as long as fuel is still being conveyed out of the space 34.

The operation of determining the filling level in the tank 10 is effected as long as fuel is still present in the main space 34 surrounding the reserve reservoir 12, above the filling level meter 56 which can be designed in conventional manner, for example also in the form of a float-operated sender. It is however also possible to use other filling level meters. Up to more or less complete emptying of the space 34 surrounding the reserve reservoir 12, the. filling level meter 56 supplies the signals which specify the filling level of the space 34 and from which the respective amount of fuel still present is determined.

At the moment in time at which the empty condition of the space 34 surrounding the reserve reservoir 12 is indicated by the filling level meter 56, a signal is sent to the electronic computer 57. The effect of that signal is that the fuel which is still present in the system at any given time, and which is practically exclusively present in the reserve reservoir 12 and the volume of which is determined, is now calculated by way of the level of fuel consumption, and the display of the respective amount of fuel which is still present is implemented on the basis of the difference between a defined volume of the reserve reservoir and the consumption which has occurred up to the time of input of the signal. The level of consumption can be readily ascertained from the respectively available operational data of the device for engine management by means of the computer. It will be apparent that in this fashion a highly accurate display is possible in a very simple manner, precisely in regard to the operating phase of a motor vehicle in which the reserve amount of fuel which is present in that case in the reserve reservoir 12 is consumed, as the last partial amount of all of the fuel which had respectively been present in the system. The first sensor 59 is disposed at a comparatively short spacing below the upper boundary of the reserve reservoir 12. It can—possibly alternatively—also be used to trigger the signal by which the fuel reserve, which is still present at any given time in the reserve reservoir, is calculated by way of the fuel consumption of the engine. However, it may be advantageous to make the change-over in terms of establishing the fuel reserve from the display of the filling level meter 56 to the consumption calculation procedure, dependent on both the empty signal being outputted by the filling level meter 56 and also a signal being outputted from the first sensor 59 to the computer 57, in which case the signal of the sensor 59 is triggered by virtue of the fact that the fuel in the reserve reservoir 12 drops below the level which is established by the position of the sensor 59.

The second sensor 68, which is disposed in the downwardly open dip pipe 58, positioned at a spacing below the first sensor 59, and which is also connected to the computer 57 by way of the appropriately arranged line 54, serves in particular to make it possible to establish a volume of fuel in the reserve reservoir 12, which is less than the volume which the sensor 59 displays. In this way, when adding relatively small amounts of fuel, whose volume together with the residual volume which had still been present in the reserve reservoir 12 is less than the total volume of the reservoir and thus gives rise to a filling state at which the level of liquid is below the level of the sensor 59, it is possible, when the level falls below the sensor 68, to again start a consumption calculation procedure, which then naturally starts from an initial value which is less than the value which corresponds to the position of the sensor 59.

In the embodiment illustrated in FIG. 1 of the drawing, the added amount of fuel would firstly pass into the main storage reservoir 34, but a large part thereof would be conveyed by the suction jet pump 38 from the main storage reservoir into the reserve reservoir again, until the main storage reservoir is again empty, so that, irrespective of the part of the tank into which the added amount of fuel initially flows, it nonetheless passes into the reserve reservoir and therein causes a rise in the level of liquid.

Figure 2:
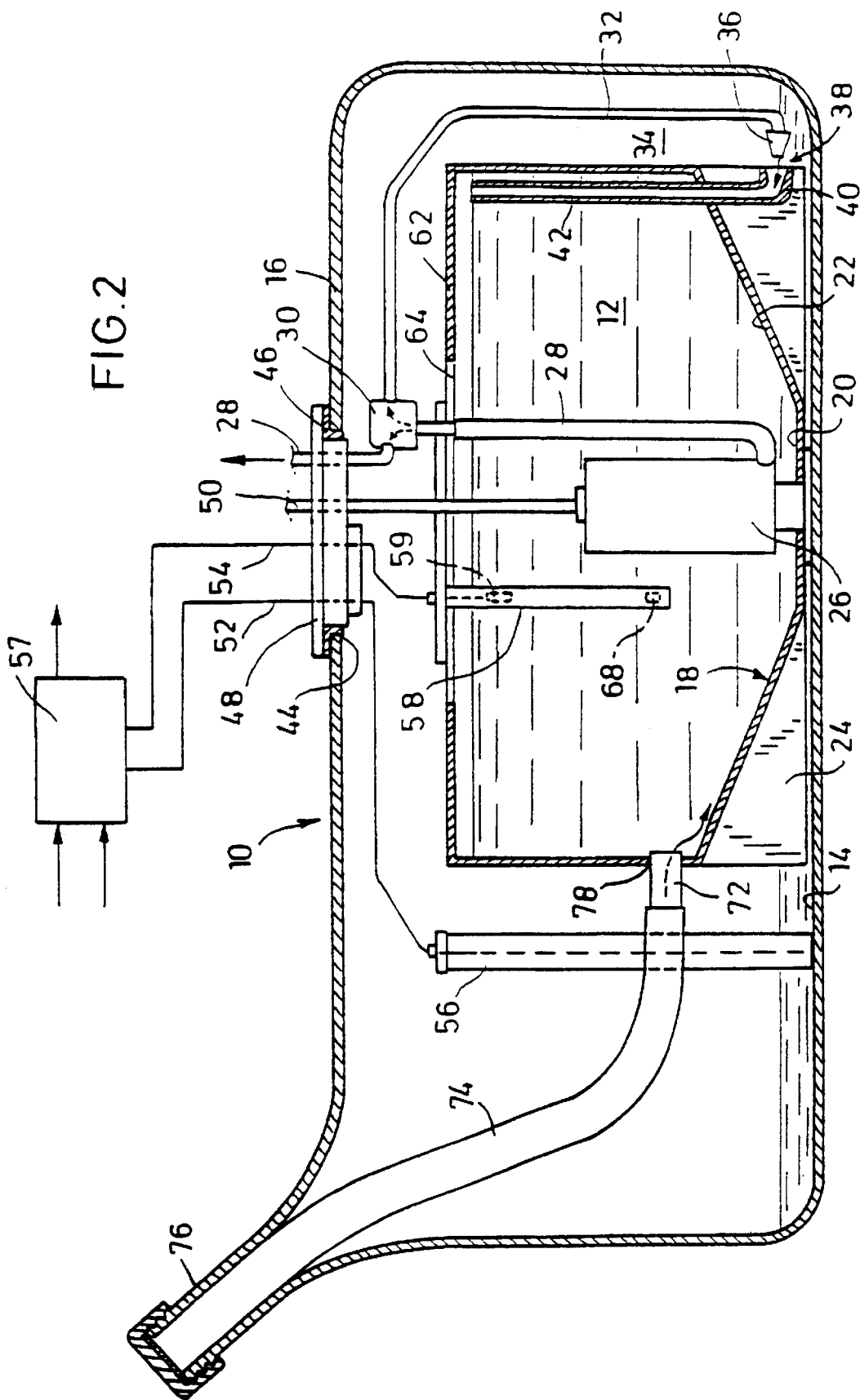
FIG. 2 is a view in longitudinal section through a second embodiment of a tank according to the invention.

In order to take account in a simple fashion of the possibility of adding amounts of fuel whose volume is so small that in total, that is to say with the residual volume which was previously still contained in the reserve reservoir, the result is a volume which is less than the volume determined by the position of the first sensor 59, it may be desirable, in accordance with the embodiment shown in FIG. 2, for the tank 10 to be provided with a particular filling pipe 74 which extends from the filling connection 76 of the tank into the reserve reservoir 12, the side wall of which is for that purpose provided with an opening 78, through which the end region 72 of the filling pipe 74 is passed in liquid-tight relationship.

As the tank 10 is filled with fuel through the filling pipe 74 which in the region of the filling connection 76 can bear in liquid-tight relationship against the internal boundary wall thereof, the entire amount of fuel which is introduced into the tank firstly flows into the reserve reservoir 12, so that, even when a small amount of fuel is introduced into the tank, the level of liquid in the reserve reservoir 12 immediately rises and it is then only a question of positioning in particular the lower sensor 68, when it responds, that is to say at what amount of fuel. At any event, this ensures that fuel supplied to the tank 10 from the exterior firstly passes into the reserve reservoir 12 and possibly—if the amount is sufficiently large—overflows from there through the upper opening 64 into the main storage reservoir 34. This embodiment avoids the situation where, when small amounts of fuel are introduced, the empty signal from the filling level meter 56 is cancelled and consequently the display in respect of the fuel reserve which is still present in the tank is initially again effected by way of the filling level meter 56. In FIG. 2 parts which are the same as those in FIG. 1 are denoted by the same references.

The arrangement of the sensor 59 at a spacing from the upper end of the dip pipe 58 or the upper boundary of the reserve reservoir 12 permits more accurate determination of the amount of fuel present in the reserve reservoir 12 at the time of beginning measurement of the fuel consumption, as inaccuracies due to fuel slopping or sloshing out of the reserve reservoir are substantially avoided. In order to obviate faulty switching by the sensor 59, it may also be desirable for it to be first rendered operative at the time at which the filling level meter 56 indicates the empty condition of the main space 34.

If there is a gap between the moment in time at which the filling level meter 56 associated with the main space 34 produces the empty signal and the moment in time at which the consumption calculation procedure begins for the purposes of determining the respective amount of fuel still present in the reserve reservoir, that is of no practical significance as such a time gap is in any case very short and the fuel consumption which takes place during the duration thereof is too slight for it to result in a markedly incorrect display of the amount of fuel present.

Even when the main space 34 is empty, the kinetic energy of the returned fuel means that it practically completely passes into the reserve reservoir 12 again, by way of the overflow pipe 42.

In addition, as a departure from the embodiments illustrated in the drawings, instead of a single-stage electric fuel pump in combination with a suction jet pump, it is also possible to use a two-stage electric fuel pump, in which case the bottom of the reserve reservoir 12 must be provided with an opening for the fuel which is to be sucked in from the main space 34 surrounding the reserve reservoir 12, and the arrangement must be such that, when the space 34 is empty, no fuel flows back out of the reserve reservoir 12 into the space 34 through that opening. In addition, under some circumstances, by taking suitable measures, care would have to be taken to ensure that, when the space 24 is empty, the first stage of the two-stage fuel pump does not become excessively hot in the absence of a cooling action due to fuel flowing in from the space 34. The measures which are possibly to be taken for that purpose however have nothing to do with the core of the invention as, in terms of use of the invention, it is immaterial how specifically the fuel is conveyed from the space 34 into the reserve reservoir 12. The only essential consideration in both cases is that the amount of fuel fed to the reserve reservoir 12 is greater than the amount of fuel which is taken from the reservoir 12 and fed to the engine.

As already mentioned, the step of reverting to normal measurement of the amount of fuel in the system by means of the filling level meter 56 associated with the space 34, when the tank is next filled, can be effected by means of a signal which is triggered by that filling level meter 56 and by means of which the computer 57 is caused to switch back to normal operation for measuring the amount of fuel in the tank system.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for determining the amount of fuel at any given time in a fuel tank of a motor vehicle, wherein the fuel tank has a main storage reservoir (34) provided with a filling level meter (56) for determining an amount of fuel contained therein and a reserve reservoir (12) having a substantially smaller volume in comparison with a volume of the main storage reservoir (34), the reserve reservoir being closed in itself and being supplied with fuel by a pump (38) from the main storage reservoir (34), the method comprising calculating a residual volume of fuel disposed in the fuel tank at a given time on the basis of fuel consumption, calculating a fuel reserve which is still contained in the reserve reservoir (12) at a given time after emptying of the main storage reservoir (34) as a difference between a defined volume of the reserve reservoir (12) and the fuel consumption summed over time, and triggering a signal for establishing a moment in time from which determination of the fuel reserve in the reserve reservoir (12) by means of consumption calculation begins in dependence on the fuel falling below a given filling level in the reserve reservoir (12).

2. The method according to claim 1, wherein the fuel consumption calculated from operational data of a device for engine management.

3. The method according to claim 1, wherein the signal for establishing the moment in time from which determination of the fuel reserve reservoir (12) by means of consumption calculation begins is triggered in dependence on a display of an empty condition in the main storage reservoir (34) and on the fuel falling below a given filling level in the reserve reservoir (12).

4. The method according to claim 1, wherein the signal by which the consumption calculation is triggered is used to trigger a reserve display on the instrument panel.

5. The method according to claim 1, wherein an engine of the motor vehicle is automatically shut off after the fuel falls below a given minimum amount of fuel in the reserve reservoir.

6. The method according to claim 5, wherein before the engine is automatically shut off a corresponding display is triggered for a driver of the motor vehicle in dependence on the filling level in the reserve reservoir (12).

7. The method according to claim 1, wherein a signal for establishing a new time from which determination of the reserve in the reserve reservoir (12) by calculation of fuel consumption begins is triggered in dependence on the fuel falling below a second filling level in the reserve reservoir (12).

8. A device for determining an amount of fuel in a fuel tank of a motor vehicle, comprising a fuel tank (10) having a main storage reservoir (34) and a filling level meter (56) for determining an amount of fuel contained therein at any given time, a reserve reservoir (12) having a substantially smaller volume in comparison with a volume of the main storage reservoir (34), the reserve reservoir (12) being closed in itself and being supplied with fuel by a pump (38) from the main storage reservoir (34), and a first sensor (59) associated with the reserve reservoir (12), wherein the first sensor (59) outputs a signal triggering a calculation procedure by which a fuel reserve still contained in the reserve reservoir (12) at any given time after emptying of the main storage reservoir (34) is determined as a difference between a defined volume of the reserve reservoir (12) and fuel consumption summed over time.

9. The device according to claim 8, wherein the filling level meter (56) associated with the main storage reservoir (34) produces a signal which is used for triggering calculation of a level of fuel consumption when an empty condition of the main storage reservoir (34) is reached, wherein the signal for establishing a moment in time from which determination of the fuel reserve in the reserve reservoir (12) by means of consumption calculation begins is triggered in dependence on an empty display in the main storage reservoir (34) and on the fuel falling below a given filling level in the reserve reservoir (12).

10. The device according to claim 8, wherein the reserve reservoir (12) is provided in its top with an opening defined by an edge extending peripherally on an inside on the reserve reservoir.

11. The device according to claim 8, wherein the reserve reservoir (12) has a shape such that movements of the fuel therein are at least substantially reduced.

12. The device according to claim 8, wherein the reserve reservoir (12) is provided with at least one further sensor (68) arranged below the first sensor (59).

13. The device according to claim 8, wherein the reserve reservoir has a volume of about 2 to 12 liters.

14. The device according to claim 8, wherein the reserve reservoir has a volume of about 2 to 15% of the volume of the tank (10).

15. The device according to claim 8, wherein a filling opening of the tank (10) is connected to the reserve reservoir (12) in such a way that at least a major part of the fuel introduced into the tank (10) passes into the reserve reservoir and from there possibly into the main storage reservoir (34).

16. The method of claim 1 wherein the pump pumps fuel from the main storage reservoir into the reserve reservoir as long as fuel is available to pump from the main storage reservoir.

17. The method of claim 16 wherein as long as fuel remains in the main storage reservoir, the pump pumps fuel from the main storage reservoir into the reserve reservoir at a rate faster than fuel is pumped out of the fuel tank.

18. The method of claim 1 wherein the pump is a suction jet pump and wherein fuel from the reserve reservoir is pumped through a portion of the main storage reservoir outside the reserve reservoir and back into the reserve reservoir so as to form the suction jet pump in the main storage reservoir.

19. The device of claim 8 wherein the reserve reservoir is mounted on a floor of the main storage reservoir and extends upwardly above the floor.

20. The device of claim 19 wherein the pump supplying fuel to the reserve reservoir from the main storage reservoir is a suction jet pump powered by an electric pump also delivering fuel from the reserve reservoir out of the fuel tank.

\* \* \* \* \*